Figure 1:
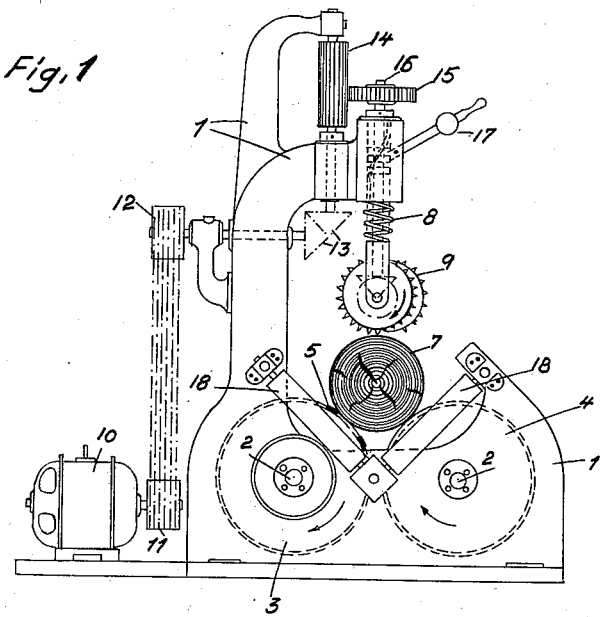

Feb. 15, 1944.   R. MEHLHORN   2,341,640
MACHINE FOR DISBARKING LOGS
Filed Oct. 17, 1939   4 Sheets-Sheet 1

INVENTOR
RICHARD MEHLHORN,
BY
ATTORNEYS

Feb. 15, 1944. R. MEHLHORN 2,341,640
MACHINE FOR DISBARKING LOGS
Filed Oct. 17, 1939 4 Sheets-Sheet 2

INVENTOR
RICHARD MEHLHORN,
BY
ATTORNEYS

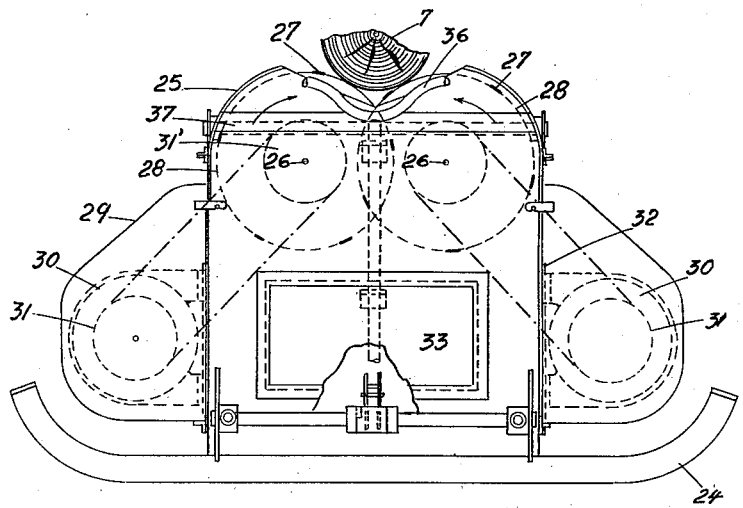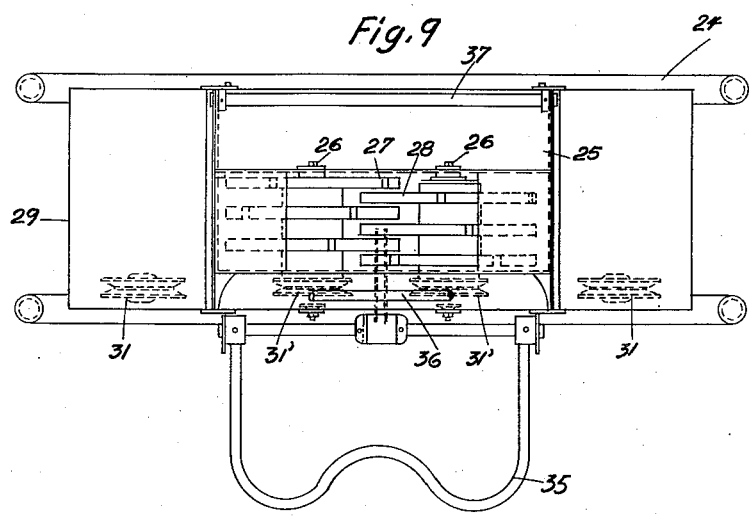

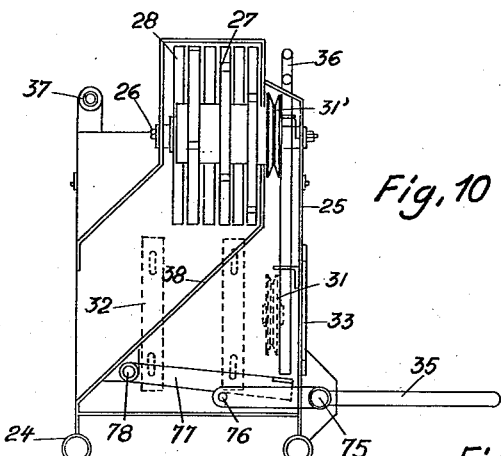
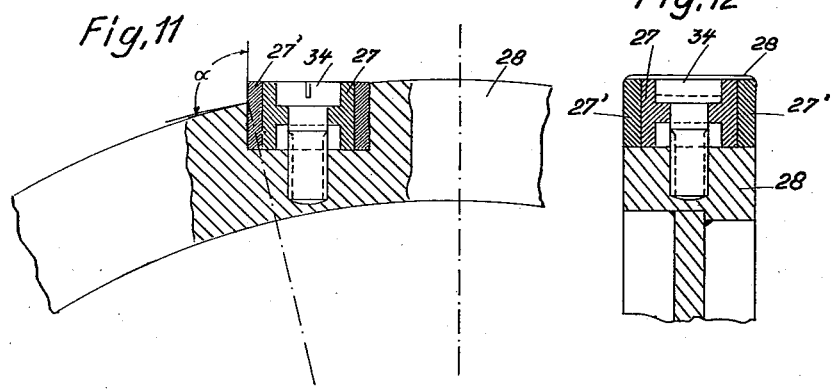
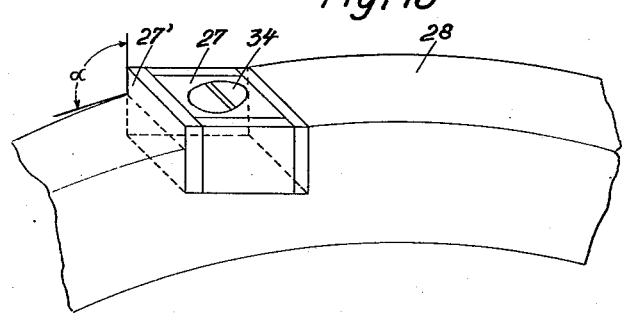

Patented Feb. 15, 1944

2,341,640

UNITED STATES PATENT OFFICE 2,341,640

MACHINE FOR DISBARKING LOGS

Richard Mehlhorn, Mannheim-Waldhof, Germany; vested in the Alien Property Custodian Application October 17, 1939, Serial No. 299,880
In Germany January 20, 1939

2 Claims. (Cl. 144—208)

This invention relates to methods of and machines for disbarking trunks especially of foliage trees. The disbarking of trunks of trees had heretofore been carried out according to various methods by peeling, milling or scaling. These known methods, however, have not been fully satisfactory inasmuch as they are but little adaptable and not at all applicable to certain kinds of barks, with the result that either the disbarking could not be effected with the necessary degree of exactness and that subsequent and rather expensive manual work had been required, or that the wastage in peeling had been quite excessive.

Especially in case of disbarking trunks of foliage trees these disadvantages are present to quite a considerable extent, this being due in the first place to the smoothness of the bark offering but a small surface of attack to the operating tools and in the second place to the rather irregular growth of trunks of this kind.

In order to avoid these drawbacks and disadvantages according to my invention I propose to effect the disbarking of trunks of trees, especially of foliage trees, by means of a disbarking disk or disks rotating about an axis parallel to the axis of the trunk in such a way that the bark is removed from the trunk by action of the blows exerted in rapid succession onto the bark by striking tools provided on said disbarking disk or disks rotating at high speed, thus entirely avoiding any operation of peeling, milling or scaling. In order to further avoid any unnecessary consumption of power, the speed of the rotating disbarking disk and therewith of said striking tools is preferably so chosen that each striking tool will be in a position to act on the bark of the trunk at the moment when the latter by action of the preceding striking tool has been slightly thrown in upward direction and thereupon again fallen back into its initial position. It has been found that it is of advantage to arrange the said striking tools in such a manner on the disbarking disk that the number of blows exerted by the former onto the bark amounts to at least 80 per second.

In this case, moreover, it is possible to use either a single disbarking disk or also a plurality of such disks, for instance two disks arranged oppositely to each other.

According to my invention the disbarking tool as a whole may for instance consist of a rotating disk provided with projecting striking tools distributed at proper distances from each other over the periphery of said disk, the front edges or surfaces of said striking tools acting on the bark to be removed from the trunk, said edges or surfaces forming an obtuse angle with the plane directed tangentially to the peripheral surface of the disbarking disk at the line of intersection with the said edges or surfaces.

The striking tools should project but little above the peripheral surface of the disbarking disk, for instance, only about from two or three millimeters and in no case more than four millimeters.

In orer to attain proper disbarking also in case of trunks of trees of especially irregular growth it will be of advantage to round-off the rotating disbarking disk as well as the striking tools provided thereon on one or both sides of said disk and said tools. In this manner provision may be made for the proper guiding of the trunk by the workman, especially in case of trunks of especially irregular or curved growth in order to attain proper disbarking.

It has further been found that the operation of the disbarking machine may be considerably improved and its working capacity increased, if instead of one disbarking disk or two oppositely disposed disbarking disks there is provided a greater number of such disks side by side on one and the same shaft. In case of using the preferred opposite arrangement of disbarking disks, the several disks mounted on one shaft may advantageously extend into the interstices between the disks on the other shaft.

It has further been found that the construction of the disbarking machine may be essentially simplified and the costs of operation greatly reduced, if the striking tools on the disbarking disk or disks are made of symmetrical shape in such a manner that the several edges of said striking tools may alternately or successively be used as striking edges. Thus the striking tool or tools, in order to use another striking edge thereof, may be taken out of the disbarking disk and again inserted thereinto after having been turned through an angle of 90 or 180 degrees.

Owing to the fact that the end of the trunk with the bark still thereon cannot well be kept in position at or nearly at the end of the operation of disbarking according to my invention I further propose to turn the trunk in horizontal direction through an angle of 180 degrees when about one half of said trunk has been disbarked so that the workman, in order to complete the operation of disbarking, may grip the trunk at the end which had already been disbarked. Such turning of the trunk may easily be accomplished by the aid of a fork which may be actuated, for instance, by a foot lever in order to slightly lift the trunk, therewith moving it out of the range of action of the striking tools on the disbarking disk or disks, when resting on said fork which is likewise arranged to be rotated in horizontal direction. In this manner the necessity of a second workman on the other side of the machine will be dispensed with.

In the accompanying drawings which form part of this specification I have represented several examples of construction of a disbarking machine constructed and operated in accordance with my invention.

Figure 2:
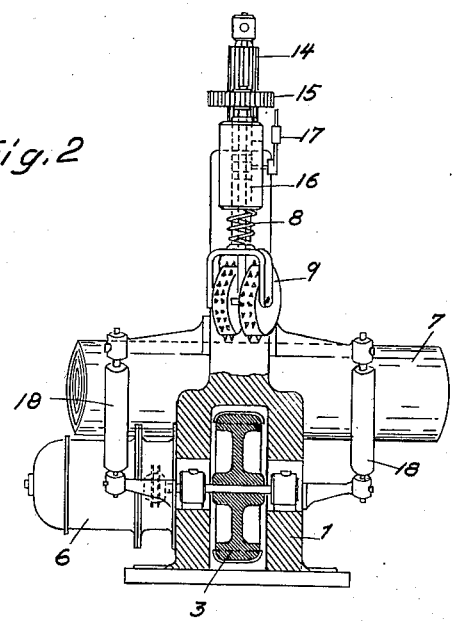
Figure 3:
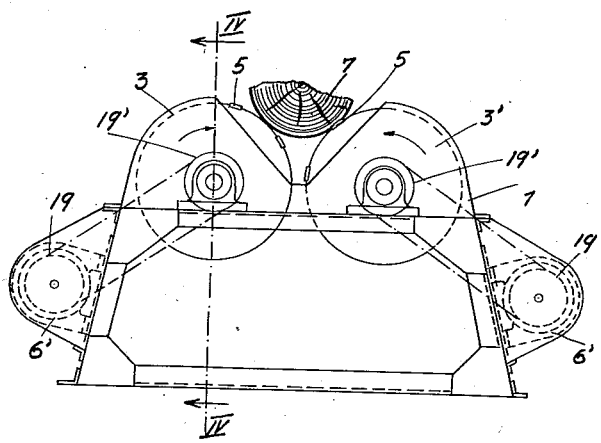
Figure 4:
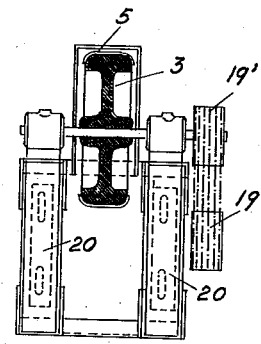
Figure 6:
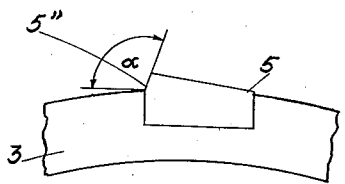
Figure 5:
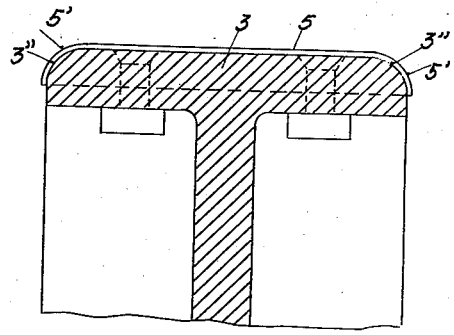
Figure 7:
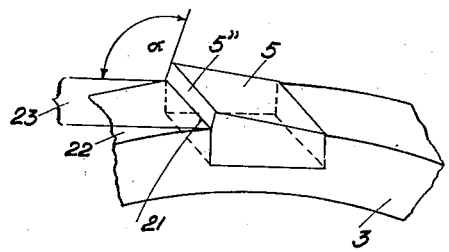

In the drawings, Fig. 1 is a side view of my novel disbarking machine having only one disbarking disk provided with the aforementioned striking tools, Fig. 2 a front-view, partly in section, of the machine shown in Fig. 1, Fig. 3 a side-view of a second example of construction of a disbarking machine provided with a pair of oppositely disposed disbarking disks with the aforementioned striking tools, Fig. 4 a cross-section along line IV—IV of Fig. 3, Fig. 5 an enlarged section through a part of a disbarking disk with the striking tools thereon which disk or disks form part of the machine shown in Figs. 1, 2 and Figs. 3, 4, respectively, Fig. 6 a side view of part of a disbarking disk as shown in Fig. 5 with one of the striking tools mounted thereon, Fig. 7 a perspective view of the disbarking disk and striking tool shown in Fig. 6, Fig. 8 a side-view of a third example of construction of a disbarking machine having a plurality of oppositely rotating disbarking disks with striking tools, Fig. 9 a top-view and Fig. 10 a front-view of the machine shown in Fig. 8, Fig. 11 an enlarged partial view and section through a part of a disbarking disk with striking tools of special construction, one of the striking tools being shown in section, Fig. 12 a section through the disbarking disk and striking tool, said section being taken perpendicularly to Fig. 11, and Fig. 13 a perspective view of the disbarking disk and striking tool shown in Figs. 11 and 13.

In the construction of the disbarking machine as shown in Figs. 1 and 2 the shafts 2 with the oppositely rotating disks 3 and 4 thereon are mounted within the cast-iron casing I of the machine. The disk 3 which is provided with the striking tools 5 is the disbarking disk proper, while the disk 4 serves only as a guide disk for the trunk to be disbarked. The two disks 3 and 4 are each driven by means of an electric motor (not shown) which may conveniently be mounted on the casing I.

The trunk 7 that is to be disbarked is pressed by way of a spring 8 and a roller chuck 9 with holdfasts against the disks 3 and 4 and at the same time fed forward. The roller chuck 9 is driven by means of an electric motor 10 by way of pulley 11, a belt as indicated in dash-dotted lines, a pulley 12, bevel gears 13, pinion 14, gear-wheel 15 meshing with the latter and shaft 16. A hand-lever 17 serves to adjust the shaft 16 and thereby to control the trunk 7 and to regulate its motion. Rollers 18 serve as guides for the trunk when being introduced into the machine as well as when being removed therefrom, the trunk sliding in either case in inclined position over said rollers.

In the second example of construction of the disbarking machine with two disbarking disks as shown in Figs. 3 and 4 the two disks 3 and 3' are both provided with striking tools 5, the said disks likewise rotating in opposite directions to each other to assist in keeping the trunk 7 in proper position intermediate the two disbarking disks 3 and 3'. Said disks are driven each by an electric motor 6' by way of the pulleys 19, 19' and belts as indicated in dash-dotted lines. In other respects the motion of the trunk takes place by means of a roller-chuck as had been described above in connection with Figs. 1 and 2.

The disk 3 is rounded-off at its sides as indicated at 3" in Fig. 5. In like manner the striking tools 5 are rounded-off at their sides, as indicated at 5' in Fig. 5 in order to fit the rounded-off sides of the disks 3 and 3".

According to Figs. 6 and 7 which show a part of one of the disks 3 with one of the striking tools 5 in an enlarged side-view and perspective view, respectively, the striking edge 5" acting on the back forms an obtuse angle $\alpha$ with a plane 23 laid tangentially onto the peripheral surface of the disk 3, rotation of said disk being assumed in counter-clockwise direction.

In the third example of construction of the disbarking machine as represented in Figs. 8, 9 and 10 shafts 26 are fixedly mounted on the sheet iron casing 25 of the machine which is mounted on skids 24, said shafts 26 carrying rotatably thereabout the disbarking disks 28 with the striking tools 27 thereon. Said disks 28 are rotated by means of the electric motors 31 and 31' mounted on reinforcing ledges 32 of the casing 25, the motors being enclosed by cover sections 29. Access to the interior of the casing may be had through the door 33.

As shown in Figs. 11, 12 and 13 the striking tools 27, of which but one is shown in these figures, are of prismatic or cubic form with striking ledges 27' soldered to each of the lateral surfaces of the body of the striking tool. The striking tools with the striking ledges as a whole are mounted in suitably shaped depressions in the peripheral surface of the disk 28 by means of countersunk screw-bolts 34. The acting surfaces of the working edges of the striking tool, moreover, are not directed radially to the disk 28 but form a certain angle with the radius of said disk. The front striking edge or surface of the striking tools, accordingly, forms an obtuse angle $\alpha$ with a plane laid tangentially to the peripheral surface of the disk 28 through the line of intersection between said striking edge or surface and said disk. Preferably this angle $\alpha$ is an obtuse angle, as otherwise, that is with a striking edge or surface at a right or not too small acute angle with the periphery of the disk 28, there will yet be attained a certain although essentially reduced disbarking effect principally on account of greater wastage in bark, because in such case there is exerted more or less a milling action instead of the pronounced striking action which is a prominent feature of my present invention. By unscrewing the screw-bolt 34 the striking tool may be taken out of the disk 28 and again inserted thereinto after having been turned through an angle of 90 or 180 degrees about its horizontal or, as the case may be, its vertical axis. In this manner it will be possible to use alternately or successively all seven other edges or surfaces of the striking tool as striking edges as had above been indicated.

The trunk 7 after having been disbarked over about one half of its length is lifted from the disbarking disks by means of an axially rotatable and vertically slidable fork 36 which may be actuated by the foot-lever 35. Lever 35 is pivoted intermediate its ends as at 75 to the framework of the apparatus, the inner end of said lever having a laterally extending pin 76 which slidably supports the free end of a second lever 77. Lever 77 is pivotally mounted as at 78 to the framework, and the extreme end of the second lever is disposed beneath the lever end of the abovementioned fork 36. By pressing upon the righthand end of lever 35 (Fig. 10), the members 76, 77 and 36 are moved upwardly to thus position the contacted portion of the trunk 7 above the rotary disks 28, at which time the trunk may be balanced upon the fork and turned end for end, through an angle of 180°, in a substantially horizontal plane, whereupon said trunk is gripped by the workman at its disbarked end and the fork again lowered so that now the part of the trunk which has not yet been disbarked will rest on the disks 28.

The guide-roller 37 serves to assist in sliding the trunk out of the machine upon completed disbarking. The chips produced during the operation of disbarking are discharged past the inclined chute 38.

I claim:

1. In a machine for disbarking trunks especially of foliage trees, the combination of one or more rotary disks provided with striking tools adapted to impart loosening blows to the bark over a relatively short length of the trunk, and means for permitting the reversal of the position of the trunk end for end, said means comprising a fork rotatable and reciprocable about a substantially vertical axis, and means for raising the fork to vertically lift the trunk above said disks, whereby the lifted trunk and fork may be bodily rotated in a substantially horizontal plane to reverse the positions of the trunk ends.

2. In a machine for disbarking trunks especially of foliage trees, the combination of one or more rotary disks provided with striking tools adapted to impart loosening blows to the bark over a relatively short length of the trunk while said trunk is advanced longitudinally past said disks, an elongated member journaled beneath said trunk, said member being rotatable and reciprocable about a substantially vertical axis, and a foot lever for vertically reciprocating said elongated member, whereby said member and trunk may be vertically lifted to position the trunk above said disks and then be rotated about said vertical axis to reverse the positions of the trunk ends.

RICHARD MEHLHORN.